Patented Nov. 20, 1945

2,389,354

UNITED STATES PATENT OFFICE 2,389,354

CELLULOSE ETHER COMPOSITION

Walter E. Gloor, New Brunswick, N. J., assignor to Hercules Powder Company, Wilmington, Del., a corporation of Delaware No Drawing. Application November 26, 1942, Serial No. 467,045

12 Claims. (Cl. 106—179)

This invention relates to compositions of matter in which cellulose ethers are combined with other substances, such as compatible plasticizers, and more particularly to compositions of matter in which cellulose ethers are combined with certain phenoxy ethanols.

It is well known that in the production of sheets, films, molding powders, molded products, varnishes, lacquers, etc., it is necessary to combine or mix cellulose ethers with certain plasticizers in order to obtain products of desirable hardness, flexibility, etc. Particularly in the molding of articles, it is desirable that plasticizers be added to lower the temperature at which the cellulose ether composition may be molded as well as to produce a product which is non-brittle.

There are a large number of desirable plasticizers known to the art for the purpose of plasticizing cellulose ether compositions but many of them are expensive and do not always give acceptable weather resistance. Dibutyl phthalate, for example, has been found particularly desirable as a plasticizer, for ethyl cellulose but ethyl cellulose plastics based upon it do not show good resistance to light or weather unless specially stabilized.

Now, in accordance with the present invention, it has been discovered that cellulose ethers and particularly ethyl cellulose may be desirably plasticized by the use of para-tertiary alkyl phenoxy ethanols giving plastics of improved weather resistance. In this manner, these phenoxy ethanols may be substituted for a part or all of the plasticizer ordinarily used.

The following are examples of methods of carrying out this invention:

Example 1

Eighty parts of ethyl cellulose having an ethoxyl content between 46.8 and 48.5% and a viscosity of 110 centipoises were colloided with 20 parts of para-tertiary butyl phenoxy ethanol. The material was cast in the form of a sheet which had desirable flexibility and toughness.

Example 2

Eighty parts of ethyl cellulose having an ethoxyl content between 44.5 and 45.5% and a viscosity of 100 centipoises were mixed with 20 parts of para-tertiary butyl phenoxy ethanol acetate. The mixture was colloided in an 80-20 acetone-alcohol mixture. The composition was sheeted, cut into molding powder, dried, and molded in the form of a disk. The product had a hardness Rockwell M of 22 and a flow temperature of 122° C.

Example 3

Eighty-four parts of ethyl cellulose having an ethoxyl content between 44.5 and 45.5 and a viscosity of 100 centipoises were mixed with 10 parts of para-tertiary amyl phenoxy ethanol and 6 parts of dibutyl phthalate. The mixture was colloided with ethyl acetate. The composition was sheeted, cut into molding powder, dried, and molded in the form of a disk. The product had a hardness Rockwell M of 60 and a flow temperature of 120° C.

Example 4

Eighty parts of ethyl cellulose having an ethoxyl content between 44.5 and 45.5 and a viscosity of 100 centipoises were mixed with 20 parts of para-tertiary amyl phenoxy ethanol. The mixture was colloided with ethyl acetate. The composition was sheeted, cut into molding powder, dried, and molded in the form of a disk. The product had a hardness Rockwell M of 33 and a flow temperature of 121° C. This composition had an outdoor weathering resistance of over 10 months. Similar unstabilized compositions using plasticizers such as dibutyl phthalate have an outdoor weathering resistance of only 1 to 2 months.

Example 5

Eighty parts of ethyl cellulose having an ethoxyl content between 44.5 and 45.5 and a viscosity of 100 centipoises were mixed with 15 parts of para-tertiary butyl phenoxy ethanol and 5 parts of dibutyl phthalate. The mixture was colloided with ethyl acetate. The composition was sheeted, cut into molding powder, dried, and molded in the form of a disk. The product had a hardness Rockwell M of 31 and a flow temperature of 114° C.

Those para-tertiary alkyl phenoxy ethanols which have been particularly useful in this invention include para-tertiary amyl phenoxy ethanol, para-tertiary butyl phenoxy ethanol, and the related ester para-tertiary butyl phenoxy ethyl acetate. Various types of plasticizers are known and those which have been found particularly useful include tributyl phosphate, tricresyl phosphate, dimethyl phthalate, dibutyl phthalate, diamyl phthalate, alkyl sulfonamides, etc.

The para-tertiary alkyl phenoxy ethanols in combination with a solvent plasticizer have been found particularly useful with ethyl cellulose, The relationship between the phenoxy ethanol and the solvent plasticizer may be varied over a wide range but a relationship of 1 part of solvent plasticizer, such as dibutyl phthalate, to 3 parts of the para-tertiary alkyl phenoxy ethanol has been found highly desirable.

The total percentage of plasticizer and ethyl cellulose may be varied widely depending on the product that is to be manufactured but, in general, from 10 to 60% of plasticizer based on the total amount of ethyl cellulose and plasticizer will be used, particularly in the forming of plastic molded articles.

The ethyl cellulose used in this invention may have an ethoxyl content within a reasonably wide range, such as 43.5 to 50%, but for most purposes and particularly for molding purposes the 44.5 to 48.5% range is preferable. The viscosity of the ethyl cellulose may also be varied considerably but the preferable range for most purposes is from about 20 to about 100 centipoises.

While the specification and examples are primarily directed to ethyl cellulose, other cellulose ethers could be used for some purposes, such as methyl cellulose, benzyl cellulose, ethyl butyl cellulose, ethyl propyl cellulose, hydroxy ethyl cellulose, ethyl benzyl cellulose, and cellulose glycollic ether.

While the invention lies in the use of the particular plasticizer or plasticizers used, other ingredients ordinarily used in plastic compositions may be used, such as fillers, pigments, dyes, stabilizers, etc.

The herein-described compositions of matter may be used to form sheets, films or coating compositions including varnishes and lacquers or molded products such as combs, electric plugs, fountain pens, telephone equipment, or as wire insulation.

The invention has thus described a new and useful composition of matter comprising a cellulose ether and one or more plasticizers including a para-tertiary alkyl phenoxy ethanol or an ester thereof and the product has good resistance to weather.

What I claim and desire to protect by Letters Patent is:

1. As a new composition of matter, a cellulose ether plasticized and stabilized by a compound selected from the group consisting of para-tertiary butyl phenoxy ethanol, para-tertiary amyl phenoxy ethanol, and para-tertiary butyl phenoxy ethyl acetate; the total amount of plasticizer in said composition being in amounts of from 10 to 60% of the total weight of plasticizer and cellulose ether.

2. As a new composition of matter, a cellulose ether plasticized and stabilized with para-tertiary butyl phenoxy ethanol; the total amount of plasticizer in said composition being in amounts of from 10 to 60% of the total weight of plasticizer and cellulose ether.

3. As a new composition of matter, a cellulose ether plasticized and stabilized with para-tertiary amyl phenoxy ethanol; the total amount of plasticizer in said composition being in amounts of from 10 to 60% of the total weight of plasticizer and cellulose ether.

4. As a new composition of matter, a cellulose ether plasticized and stabilized with para-tertiary butyl phenoxy ethyl acetate; the total amount of plasticizer in said composition being in amounts of from 10 to 60% of the total weight of plasticizer and cellulose ether.

5. As a new composition of matter, a cellulose ether plasticized and stabilized by a compound selected from the group consisting of para-tertiary butyl phenoxy ethanol, para-tertiary amyl phenoxy ethanol and para-tertiary butyl phenoxy ethyl acetate, and another plasticizer; the total amount of plasticizers in said composition being in amounts of from 10 to 60% of the total weight of plasticizers and cellulose ether.

6. As a new composition of matter, a cellulose ether plasticized and stabilized by a compound selected from the group consisting of para-tertiary butyl phenoxy ethanol, para-tertiary amyl phenoxy ethanol and para-tertiary butyl phenoxy ethyl acetate, and a solvent plasticizer for said cellulose ether; the total amount of plasticizers in said composition being in amounts of from 10 to 60% of the total weight of plasticizers and cellulose ether.

7. As a new composition of matter, a cellulose ether plasticized and stabilized by a mixed plasticizer containing about 1 part of a solvent plasticizer for said cellulose ether and about 3 parts of a compound selected from the group consisting of para-tertiary butyl phenoxy ethanol, para-tertiary amyl phenoxy ethanol, and para-tertiary butyl phenoxy ethyl acetate; the total amount of plasticizers in said composition being in amounts of from 10 to 60% of the total weight of plasticizers and cellulose ether.

8. As a new composition of matter, ethyl cellulose plasticized and stabilized by a compound selected from the group consisting of para-tertiary butyl phenoxy ethanol, para-tertiary amyl phenoxy ethanol, and para-tertiary butyl phenoxy ethyl acetate; the total amount of plasticizer in said composition being in amounts of from 10 to 60% of the total weight of plasticizer and cellulose ether.

9. As a new composition of matter, ethyl cellulose plasticized and stabilized by a compound selected from the group consisting of para-tertiary butyl phenoxy ethanol, para-tertiary amyl phenoxy ethanol and para-tertiary butyl phenoxy ethyl acetate, and a solvent plasticizer for said ethyl cellulose; the total amount of plasticizers in said composition being in amounts of from 10 to 60% of the total weight of plasticizers and ethyl cellulose.

10. As a new composition of matter, ethyl cellulose of an ethoxy content between 43.5% and 50% plasticized and stabilized by a compound selected from the group consisting of para-tertiary butyl phenoxy ethanol, para-tertiary amyl phenoxy ethanol, and para-tertiary butyl phenoxy ethyl acetate; the total amount of plasticizer in said composition being in amounts of from 10 to 60% of the total weight of the plasticizer and ethyl cellulose.

11. As a new composition of matter, ethyl cellulose of an ethoxy content between 44.5% and 48.5% plasticized and stabilized by a compound selected from the group consisting of para-tertiary butyl phenoxy ethanol, para-tertiary amyl phenoxy ethanol, and para-tertiary butyl phenoxy ethyl acetate; the total amount of plasticizer in said composition being in amounts of from 10 to 60% of the total weight of the plasticizer and ethyl cellulose.

12. A plastic composition comprising 80 parts ethyl cellulose, said ethyl cellulose having an ethoxyl content between 44.5 and 45.5% and a viscosity of 100 centipoises, and as a plasticizer and stabilizer therefor 20 parts para-tertiary amyl phenoxy ethanol.

WALTER E. GLOOR.